United States Patent [19]
Minkoff

[11] Patent Number: 5,926,135
[45] Date of Patent: Jul. 20, 1999

[54] STEERABLE NULLING OF WIDEBAND INTERFERENCE SIGNALS

[75] Inventor: John Minkoff, Englewood, N.J.

[73] Assignee: Lucent Technologies, Murray Hill, N.J.

[21] Appl. No.: 09/004,577

[22] Filed: Oct. 8, 1998

[51] Int. Cl.[6] .................................. G01S 3/16; G01S 7/36
[52] U.S. Cl. .............................................. 342/379; 342/17
[58] Field of Search .................................... 342/379, 380, 342/381, 375, 17, 19

[56] References Cited

U.S. PATENT DOCUMENTS

| | | | |
|---|---|---|---|
| 5,363,111 | 11/1994 | Murphy | 342/383 |
| 5,371,506 | 12/1994 | Yu et al. | 342/380 |
| 5,422,908 | 6/1995 | Schilling | 375/203 |

Primary Examiner—Mark Hellner
Attorney, Agent, or Firm—Darby & Darby

[57] ABSTRACT

Apparatus for steerable nulling of a radiation pattern of a main lobe and at least one side lobe with at least one null point produced by an antenna array of n elements relative to wideband radio frequency signals having a carrier wave modulated with pulse signals, while receiving the radio frequency signals from, or transmitting to, a desired station and at least one interfering station. An interference rejection processor (IRP) that has n inputs, each connected to a respective element of the antenna array, is connected between the receiver or transmitter and the antenna array. The IRP steers the effect of the antenna radiation pattern such that the at least one null point substantially corresponds to the reception of the radio frequency signal from, or transmission to, the interfering station. The antenna array has an aperture bandwidth, E, such that the IRP is implemented using only phase delay of the radio frequency signals to steer the radiation pattern.

17 Claims, 6 Drawing Sheets

FIG. 1
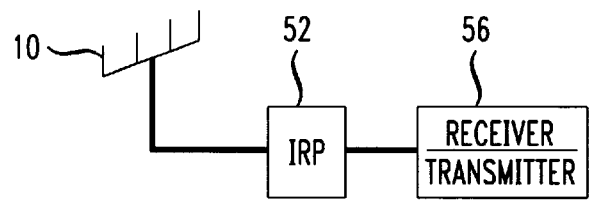
FIG. 2A SINGLE-STAGE IRP
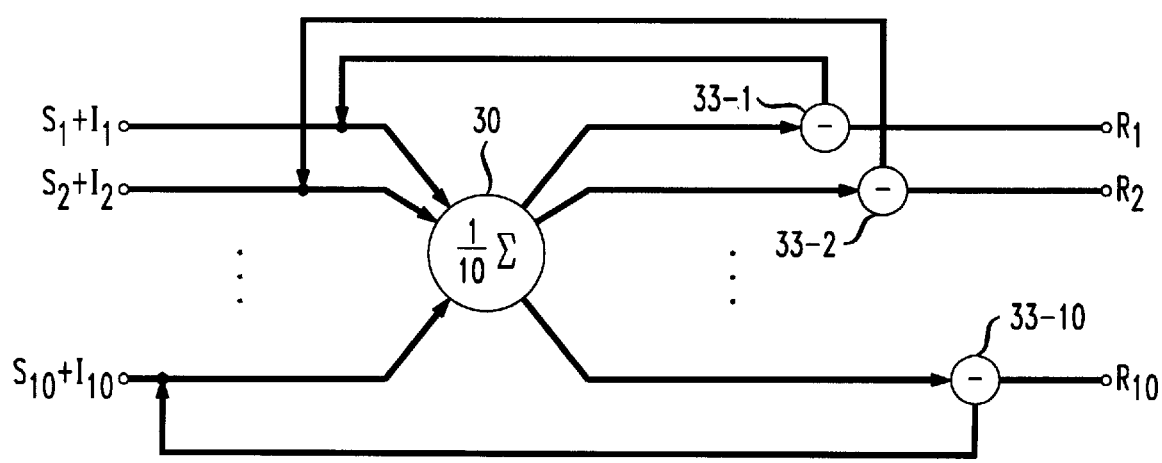

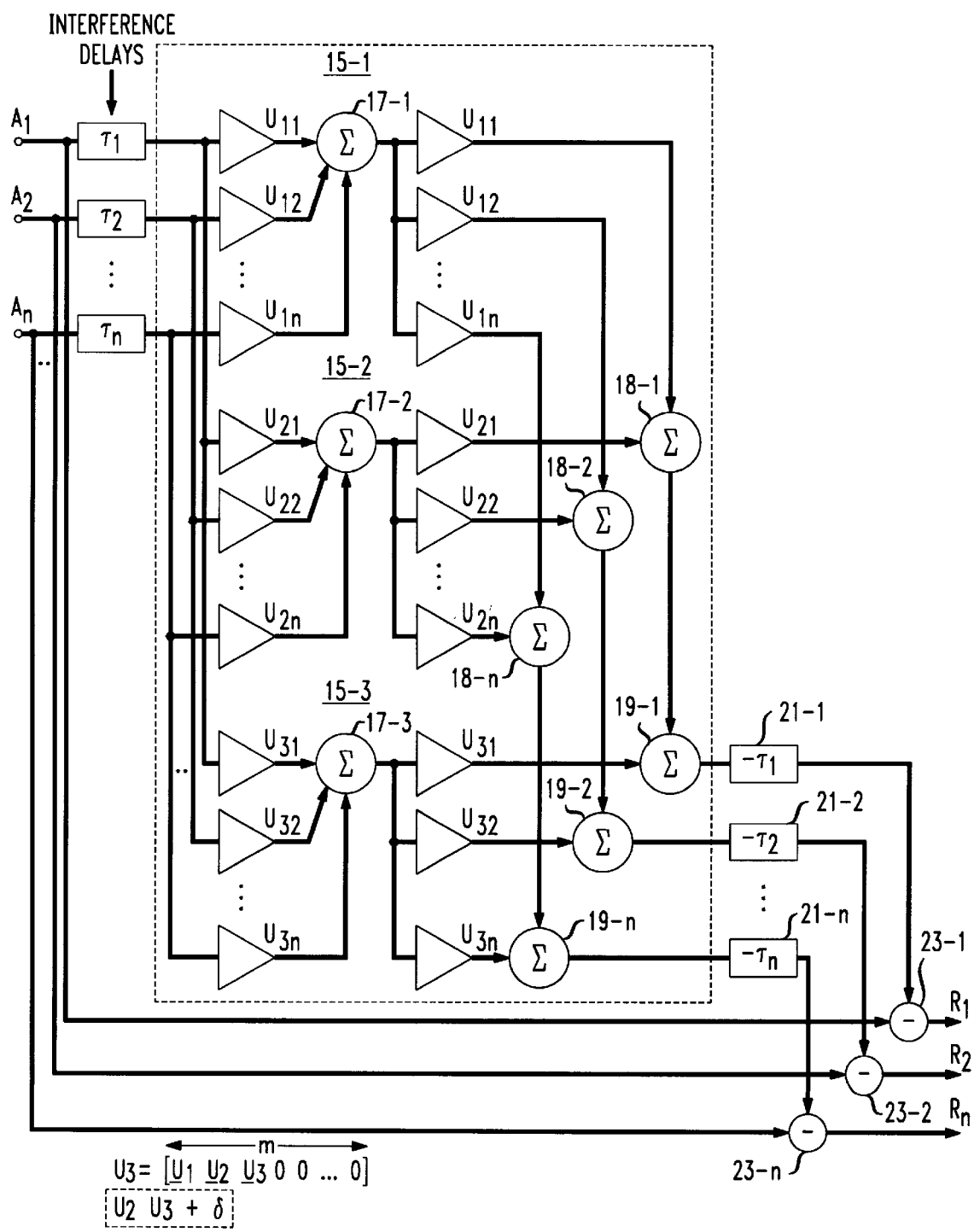

RESULTS OF IRP PROCESSING SINGLE SIGNAL ONLY

RESULTS OF IRP PROCESSING SIGNAL PLUS SINGLE INTERFERER

RESULTS OF IRP PROCESSING SINGLE INTERFERENCE SIGNAL
DISTORTED BEAMPATTERN
AFTER INTERFERENCE REJECTION

RESULTS OF IRP PROCESSING SINGLE INTERFERENCE SIGNAL
UNDISTORTED BEAMPATTERN AFTER
CORRECTION FOR PROCESSING DISTORTION

RESULTS OF IRP PROCESSING MULTI-INTERFERENCE
WITH TWO LARGE INTERFERERS

RESULTS OF IRP PROCESSING MULTI-INTERFERENCE
AFTER REJECTION OF INTERFERER $I_1$

RESULTS OF IRP PROCESSING MULTI-INTERFERENCE AFTER REJECTION OF INTERFERER $I_2$

RESULTS OF IRP PROCESSING MULTI-INTERFERENCE AFTER CORRECTION OF PROCESSING DISTORTION

STEERABLE NULLING OF WIDEBAND INTERFERENCE SIGNALS

FIELD OF THE INVENTION

The invention relates to a system that reduces interference in the reception of radio frequency (rf) signals by the effective steering of one or more nulls of an antenna radiation pattern using an interference rejection processor (IRP).

BACKGROUND OF THE INVENTION

Antenna arrays are widely used in the communications field. Such antennas comprise a number of elements that form a radiation beam pattern during transmission and reception of a signal. The beam has a number of lobes and one or more nulls and the strength of the received signal applied to the receiver from the antenna, and that of the signal applied from a transmitter for transmission, depends upon the antenna beam pattern. Another factor is the angular orientation of the antenna array relative to the source of the received signal or to the target of a transmitted signal.

An array antenna operating in the receiving mode can also receive signals from interfering sources that may adversely affect the receiver. For example, consider an antenna that receives signals from two sources spaced apart, with the connected receiver being interested only in the signals from one of the sources. The signal of interest preferably would be in the main lobe of the antenna beam pattern and the signal from the other source, the interferer, would be in a side lobe. But if the signal received from the interferer in a beam pattern side lobe is strong enough, it may obscure the signal of interest during processing by the receiver. The problem increases when two or more interfering signal sources are present.

In the undersea acoustic field, a technique has been developed for a passive system, that is, one for which the signals emanate from a target, to discriminate against the interfering signal(s) emanating from a source(s) other than the one of interest. This technique uses an Interference Rejection Processor (IRP) placed between the array of acoustic transducers and the receiver. The acoustic signals are usually of a sinusoidal, continuous wave, nature and of relatively narrow bandwidth. The IRP operates to effectively process the received signal in a manner that corresponds to greatly reducing the sidelobe level of the acoustic transducer array beam pattern directed at the source of an unwanted interfering signal. Thus, the signal from the unwanted interfering target has a reduced level when applied to the receiver so that it can be more easily discriminated against, or ignored. This increases the ratio of signal power to interference power and therefore the detectability of the received signal emanating from the target of interest which is applied to the receiver for processing. The IRP technique is described in U.S. Pat. No. 4,017,867 granted Apr. 17, 1977 to Alfons Claus, which is assigned to the assignee of the subject application.

An improvement of the IRP of the Claus patent is described in "IRP (interference rejection processor) revisited - a new approach to multiple interference rejection and elimination of beam pattern distortion", by J. Minkoff, Journal of the Acoustical Society of American ("JASA"), Vol. 91, No. 2, February 1992, pages 832–843, which is incorporated herein by reference. The IRP of the Minkoff paper deals with interfering signals emanating from multiple sources at spaced locations relative to the radiation pattern of the array of acoustic transducers. It provides improved performance in discriminating against signals from multiple interference sources and elimination of the distortion in the antenna beam pattern.

Neither the IRP of the Claus patent nor that of the Minkoff paper contemplates use of the IRP for wideband radio frequency signals, such as those used in cellular communication systems, where there are a multitude of active stations at different locations that transmit radio frequency type signals to communicate with each other. This differs from the undersea acoustic use in several significant respects.

Present day cellular communication systems typically operate in the frequency range of 800 Mhz to 900 Mhz and employ pulse transmission of the electromagnetic radio frequency wave signal. Such signals differ from the sinusoidal type acoustic signals since they are wideband in nature with a typical waveform being a carrier wave modulated by an envelope consisting of a pulse train. During operation, a cell station either receives a signal to be provided to a subscriber, or transmits a signal to another cell station of the network, or to individual users of the network. The stations of the cellular system are spaced apart and operate on line of sight communication. Frequently, two or more cell stations transmitting signals can be in the line of sight of a receiving cell station. Due to the line of sight communication, a problem arises at a cell station operating as a receiver in that the radio frequency signals received by its antenna from one or more stations other than the one of interest creates an interference problem. Other sources of interference, e.g., radio transmitters, also exist.

Also, due to the relative delays between elements of the antenna array receiving radio frequency signals at a cell station, both the relative phase of the carrier wave and the pulse envelope can be shifted at the different elements of the array. Unlike the case of a pure sinusoid of an acoustic signal, where a simple phase shift by the IRP is sufficient to effect steering of the beam pattern to correct for the phase delays, it would reasonably appear by applying conventional theory that this would not be effective for a pulse train signal that is sufficiently wideband as compared to the carrier wave of a radio frequency signal. For such a wideband signal, coherent summation may require true amplitude time delay to compensate for the relative delays between the antenna array elements. This represents a very significant, and possibly, prohibitively costly, increase in system complexity.

BRIEF DESCRIPTION OF THE INVENTION

The present invention relates to a system for radio frequency wave signals, such as used in a cellular telephone network, that reduces interference at a receiving station of signals received from unwanted stations at multiple distinct locations. In accordance with the invention, the system for a receiving station includes an array type antenna and an IRP that is located between the antenna and station receiver. The IRP is configured to have an algorithm that processes the received radio frequency signal in a manner corresponding to steering the antenna beam such that a received interfering signal is located at a null point of the antenna beam radiation pattern. This increases the ratio of the power of the signal of interest to the power of the interfering signal (SIR), thereby increasing the quality of the signal of interest. Steering a null in the direction of the interference by the IRP is done without distortion of the antenna beam radiation pattern. The system of the invention also can discriminate against interfering signals from stations at multiple spaced locations without distortion of the antenna radiation pattern.

In a preferred embodiment of the invention, the aperture beamwidth of the antenna is made to be relatively small.

This permits use of an IRP providing a simple phase shift to correct for the phase delays of the pulses of the radio frequency signal between the elements of the antenna array while being able to effect steering of the beam pattern.

In addition to increasing the SIR, the invention also enables frequency reuse in wireless radio frequency communication systems by removing signals from competing emitter stations in neighboring cell sites. The invention also can be applied to eliminate multipath signal reflections in urban environments.

The system of the present invention is also reciprocal. That is, it can use an IRP to modify a signal being applied to an array antenna for transmission so that the antenna radiation pattern is effectively improved for signal transmission.

OBJECTS OF THE INVENTION

It is therefore an object of the invention to provide a system for radio frequency wave signals of the type having a pulse train on a carrier wave that utilizes an array type antenna and an interference rejection processor.

Another object is to provide a receiver system for radio frequency signals using an interference rejection processor that is capable of minimizing the effect of unwanted interfering signals received from multiple sources.

An additional object is to provide a system for communication with wideband radio frequency signals of the type having a pulse train on a carrier wave utilizing an array type antenna having a relatively small aperture beamwidth so as to permit use of an IRP providing a simple phase shift to correct for the phase delays of the pulses of the radio frequency signal between the elements of the antenna array while effecting steering of the beam pattern.

A further object is to provide a system for the cell stations of a multi-site cellular communication network that are in line of sight in which a receiving cell station can reduce the effect of one or more unwanted interfering signals, thereby possibly enabling frequency reuse.

BRIEF DESCRIPTION OF THE DRAWINGS

Other objects and advantages of the present invention will become more apparent upon reference to the following specification and annexed drawings, in which:

FIG. 1 is a schematic diagram of the receiver system of a station having an interference rejection processor;

FIG. 2A is a schematic diagram of one type of interference rejection processor capable of producing a null three beamwidths wide;

FIG. 2B is a schematic diagram of a simplified form of an interference rejection processor capable of producing a null one beamwidth wide;

DETAILED DESCRIPTION OF THE INVENTION

Figure 3A:
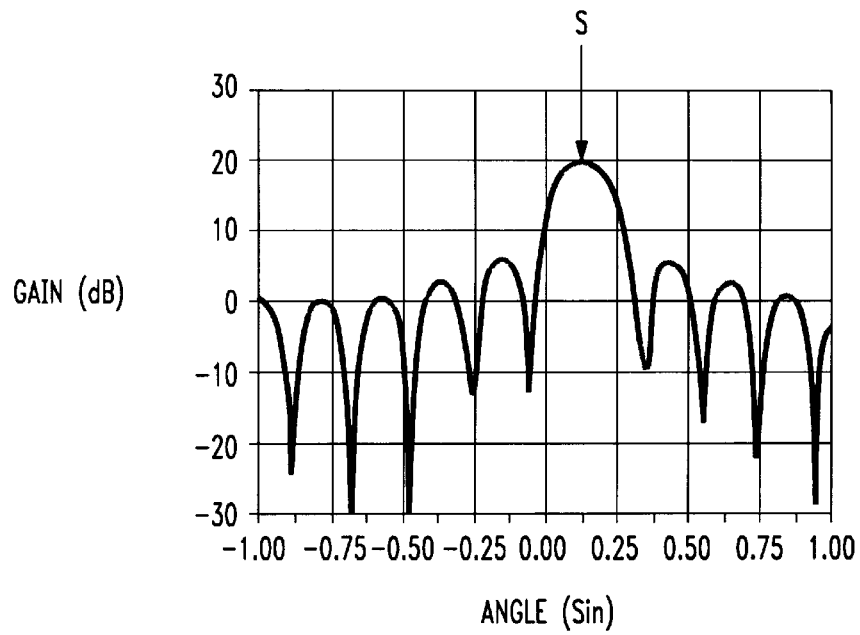
FIGS. 3A–3D are diagrams showing antenna radiation beam patterns for the receiver after modification by the interference rejection processor.

FIG. 1 shows a radio frequency communication station, for example, a station of a cellular network, having a conventional array antenna 50 with a number of elements that are spaced from each other by a predetermined distance. The output of the antenna 50 is applied to an IRP 52 and the output of the IRP is applied to a receiver 56. The antenna 50 has a radiation pattern consisting of a main lobe (maximum amplitude) and a number of side lobes of reduced amplitude.

A key parameter in an array antenna 50 is the aperture-bandwidth product E, stated as:

$$E=(n-1)B/f \quad (1)$$

where n is the number of elements in the array, B is the signal bandwidth, and f is the carrier frequency of the signal. The carrier wave is typically sinusoidal. In expression (1) it is assumed that, as is customary, the antenna elements are spaced by one half the wavelength of the carrier frequency. This achieves the maximum angular resolution while eliminating grating for all pointing directions in the visible half space, that is, within ±90 degrees incidence of the array. The quantity B/f is actually the fractional bandwidth. In a cellular telephone network a typical carrier frequency f=800 Mhz–960 Mhz, a typical bandwidth B=1 Mhz for the pulses on the carrier wave and a typical wireless antenna array has four elements. Therefore, E would be in the range of 0.003125 to 0.00375.

For such small values of E, even for received signals at end fire to the antenna radiation pattern, that is, where the angle of incidence of the received signal to the array is at ±90°, the pulse amplitudes of the signals received at the opposite ends of the array are almost completely overlapping. As a result, coherent summation of the signals over the elements of the array, which is necessary for beam forming as well as for signal-to-noise ratio enhancement, can be accomplished simply by appropriate phase shifting of the carrier at each element of the array. That is, since under these conditions there are many cycles of the carrier wave per pulse of the pulse train signal, even if the pulse amplitudes at opposite ends are only slightly non-overlapping the carrier cycles may not be in phase. Once the required phase shifting of the carrier wave has been implemented however, the pulse signals at the opposite ends of the array are effectively identical for all practical purposes and will therefore add coherently.

In the case of a signal, such as used in a cellular communication system, which consists of a carrier wave modulated by generally rectangular or square pulses, the signal bandwidth B is nominally the reciprocal of the pulse duration t, that is, B=1/t. If the elements of the antenna array are spaced apart by half a wavelength (lambda/2), the delay time T across the array can be expressed as $$T=(n-1)\text{lambda}/2c=(n-1)/2(\text{lambda}/c)=(n-1)/2(1/f)=n-1/2f \quad (2)$$

where c is the speed of light. Thus, the aperture bandwidth can be expressed as $$E=(n-1)B/f=2T/t \quad (3)$$

meaning that E is proportional to the ratio of the delay time T across the array to the duration of the pulses of the signal.

The parameters of systems of interest in the cellular communications field have extremely small values of E. For example, for a 1 Mhz signal bandwidth, a carrier frequency of 1 Ghz, and a four element array, E=0.003. This means that each pulse of the waveform envelope is shifted only slightly from one antenna element to another at any given time. Therefore, an IRP can be used which employs phase shifters only. This is of major importance regarding the feasibility of the use of an IRP for wireless applications.

As E increases, the degree of overlap of the pulses at the opposite ends of the array decreases. For example, under conditions where E=0.1, the pulses at opposite ends of the array still will have about a 90% overlap. This would still be adequate for many types of signal processing by the receiver, to permit use of an IRP which employs only phase shifters. If the pulse amplitudes at opposite ends of the array were not essentially overlapping, as would be the case for large values of E, such as E ≈1, signal coherence across the array could be achieved only with the use of true time delay systems which are difficult and expensive to implement in radio and radar systems because of the extreme spatial lengths of even short duration radio frequency pulses owing to the speed of light being $3\times10^8$ meters/second. It should be noted that the true time delay problem is not as severe at acoustic wavelengths used in the undersea application described above because the speed of propagation in water is smaller by a factor of about $10^5$. Use of an IRP which employs only phase shifters in large measure depends upon the amount of signal degradation (greater amount of non-overlap of the pulses at opposite ends of the array, corresponding to higher values of E) that can be tolerated by the receiver while still processing the received signals with sufficient accuracy. Values of E up to at least about 0.15 should be possible in many applications.

An IRP is capable of eliminating interference from signal sources of finite angular width, e.g., the source has an antenna with a predetermined radiation beam pattern, as well as from point sources. A block diagram of a three-stage IRP system capable of removing interference from a source having an antenna radiation pattern of three beamwidths in angular extent is shown in FIG. 2A.

In FIG. 2A, input ports $A_1$ through $A_n$ correspond to the input from each of the elements of the antenna array 50 of the receiving station. Each of the ports $A_1$ through $A_n$ is connected respectively to a phase shifter delay element $\tau_1$ through $\tau_n$. There are three sets of multiplication stages 15-1, 15-2 and 15-3, with each having a set of amplifiers to produce multiplication factors for the input signals. Multipliers 15-1, 15-2 and 15-3 are basically the same. Each multiplier 15 has a set of multiplier amplifiers and each multiplier receives an input signal from a corresponding one of the phase delay elements $\tau_1$ through $\tau_n$. Multiplier 15-1 comprises n multipliers with outputs $U_{11}$ through $U_{1n}$ and a summer circuit or summer 17-1 for summing the multiplied outputs. Multiplier 15-2 comprises n multipliers with outputs $U_{21}$ through $U_{2n}$ and a summer 17-2 connected to receive the multiplied outputs. Multiplier 15-3 comprises n multipliers with outputs $U_{31}$ through $U_{3n}$ and a summer 17-3 connected to receive the multiplied outputs.

As discussed in the aforesaid Minkoff article, the outputs $U_{1n}S$, $U_{2n}S$ and $U_{3n}S$ are elements of the eigen vectors of the covariance matrices characterizing the interference.

Figure 3B:
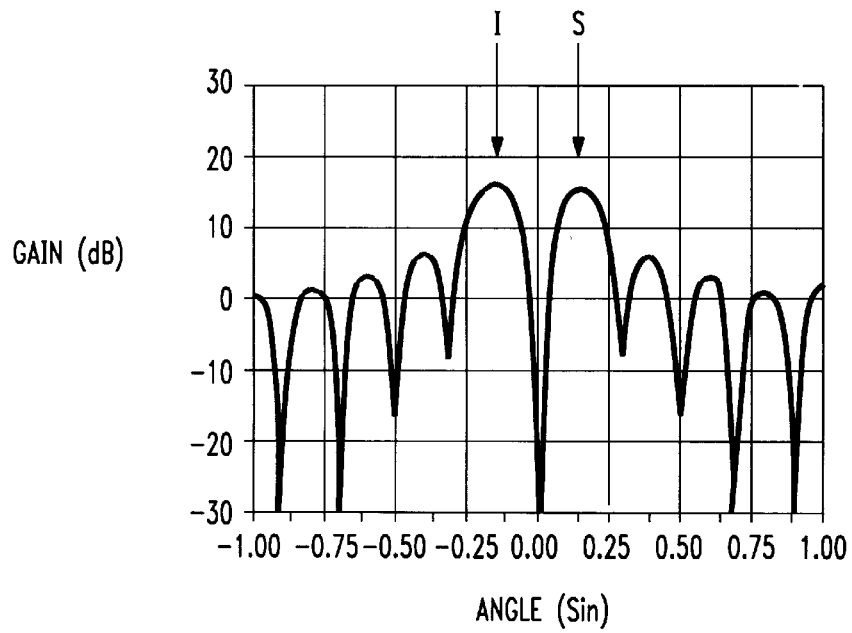
Figure 3C:
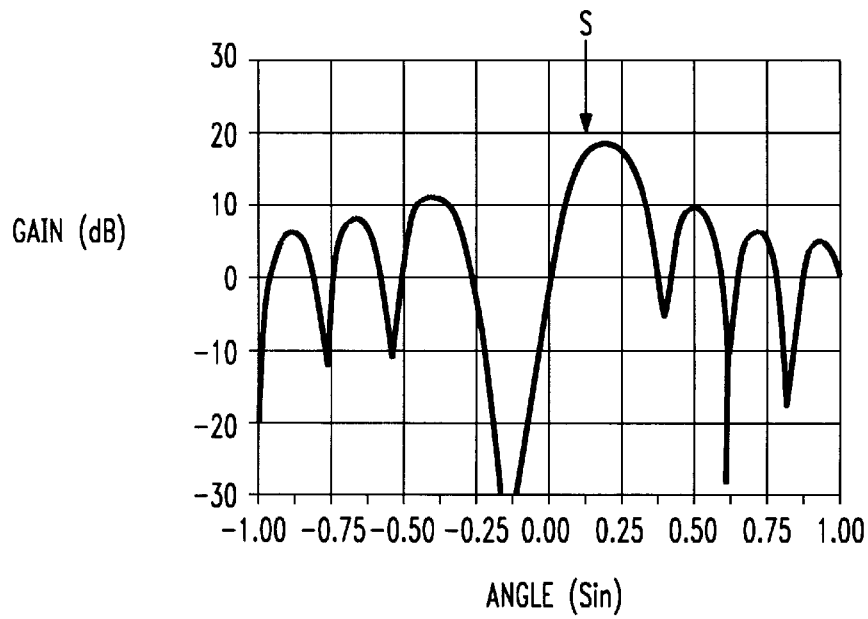
Figure 3D:
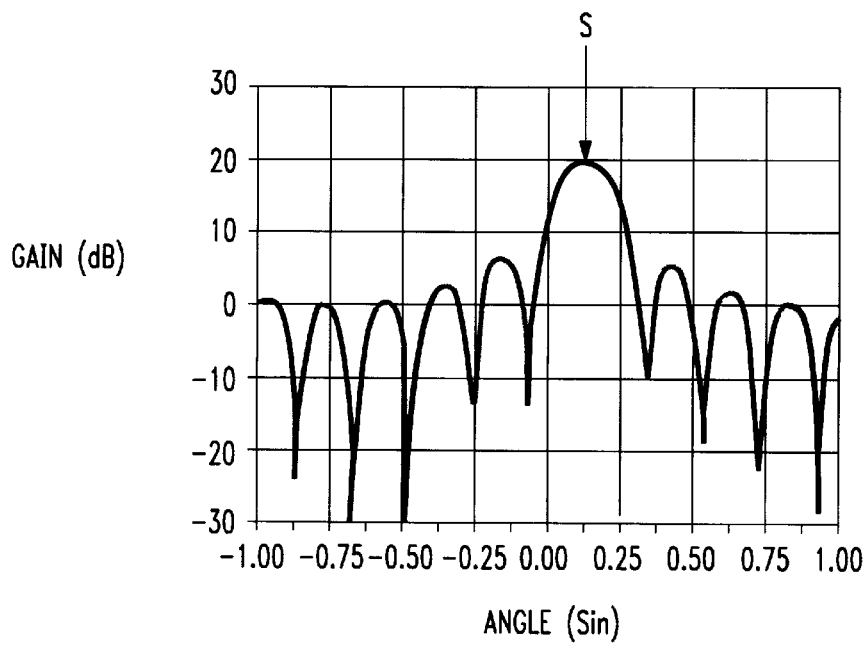

In this way, the interference, say for one interferer, is removed, as seen in FIG. 3C, but as is also seen, the beam pattern is somewhat distorted. The JASA paper by Minkoff deals with developing methods to remove this distortion which is a critical step in multi-interference rejection.

These mathematical operations are easily and inexpensively implemented, which makes IRP a very practical scheme. For a single stage IRP for an antenna array with n elements, the U's are all equal to 1/n.

The operation of an IRP for this case, for which a null of one beam width wide is produced, is as follows. For simplicity, it is considered that the received interfering signal is broadside to the array. In practice, this is achieved for arbitrary angles of incidence by rotating the signal and interference phase fronts, that is, by momentarily pointing the main beam of the antenna at the interference before applying the algorithm of the IRP. Prior to this the antenna beam is pointed at the source of the signal of interest. In this example, the processing diagram for the resulting one-stage IRP reduces to that shown in FIG. 2B. Here, the multiplier-summer is represented by element 30, which receives inputs S+I from each of the antenna elements $A_1$ through $A_n$, where S and I are the amplitudes of the desired signal and interference signal at the respective array elements. There are subtractors 33-1 through 33-n connected to multiplier-summer 30 to receive its output and each subtractor also receives the signal from the corresponding antenna element $A_1$ through $A_n$. The output of the respective subtractor is shown as $R_1$ through $R_n$.

The algorithm for the IRP of FIG. 2B entails subtracting from the output of each antenna array element a suitably normalized sum of the outputs from each element. Thus, say for the nth element in a four element array, the operation is $$I_o + S_o - 1/n \sum_{k=1}^{n}(I_k + S_k) \tag{4}$$

where $S_k$ and $I_k$ are the amplitudes of the desired signal and interference signal at the nth element of the array. But since the interference signal is broadside to the array, $I_k = I$ for all n, yielding for the desired signal $$S_o - 1/n \sum_{k=1}^{n} S_k \tag{5}$$

if the desired signal is of the form $$S(t) = A(t)e^{i(2\pi f t + \theta)} \tag{6}$$

Strictly speaking equation (4) would be $$A(t) - 1/n \sum_{k=1}^{n} A(t - k\Delta t)e^{i(2\pi f(t - k\Delta t) + \theta)} \tag{7}$$

where $\Delta t$ is the time delay between elements. But because n is small, then to a very good approximation $$A(t) = A(t - k\Delta t) \tag{8}$$

for all n, which yields $$A(t)e^{i(2\pi f t + \theta)}\left(1 - 1/n \sum_{n=1}^{n} e^{-i2\pi f k \Delta t}\right) \tag{9}$$

The term in brackets, termed the "IRP transfer function", is deterministic and known and can therefore be removed, yielding an undistorted signal with no interference. For non-broadside interference, since as noted above the beam must be pointed momentarily at the interfering source, it must then be re-pointed back to the source of interest.

Consider the IRP of FIG. 2A in an application where it receives a signal from a station of interest and from an interfering station. FIG. 3A shows a beam pattern for an assumed station of interests at an angle of 7.63° of the beam pattern of the receiving station antenna, and FIG. 3B shows the pattern for the station of interest and an assumed interferer at −7.63°. After application of IRP, in this case with three stages such as shown in FIG. 2, the resulting beam pattern producing the signal(s) to be applied to the receiver 56 is shown in FIG. 3C. The interference (I) has been replaced by the null, and only the desired station signal pattern—slightly shifted from its true position in the beam pattern—is present. While the signal from the station of interest is at the main lobe, as desired, there is distortion in the pattern, which is caused by the aforementioned IRP transfer function. This would be tolerable in an ordinary passive sonar or radar application, but possibly could result in an increased bit error rate in RF communication applications, such as cellular telephones.

Removal of the IRP transfer function is also essential for multi-site interference rejection. For suppose there are two interferers. As noted above the array is pointed at one of them and the foregoing operations are carried out. But now the second interferer has also been subjected to the IRP transfer function which must be accounted for before proceeding with its removal.

Figure 4A:
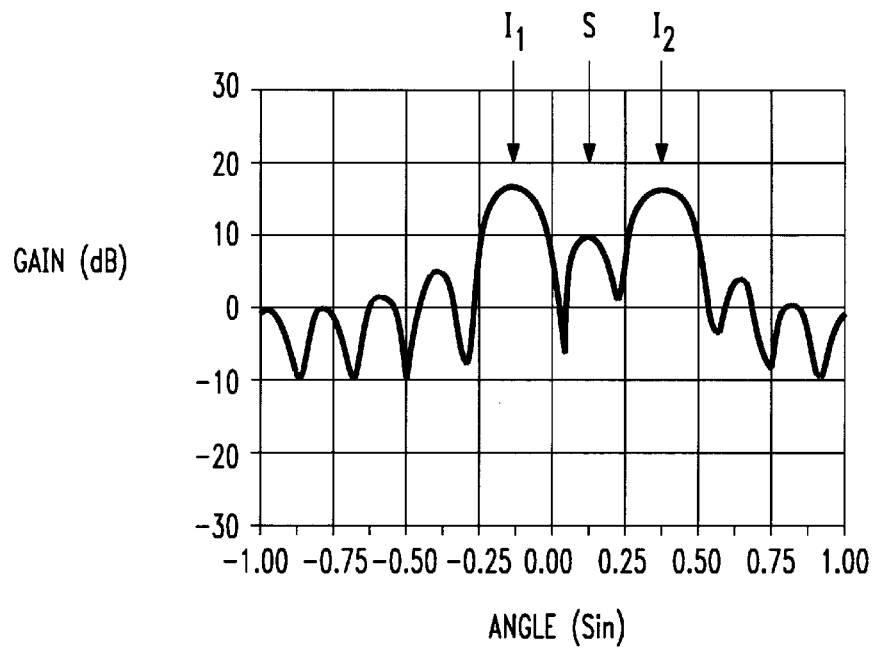
FIGS. 4A–4D are diagrams showing antenna radiation beam patterns for multiple interfering stations.
Figure 4B:
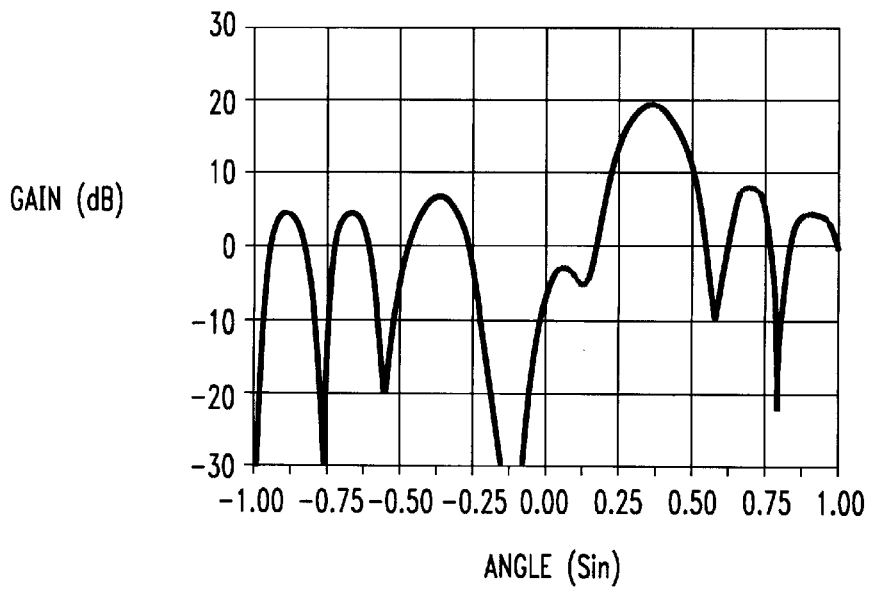
Figure 4C:
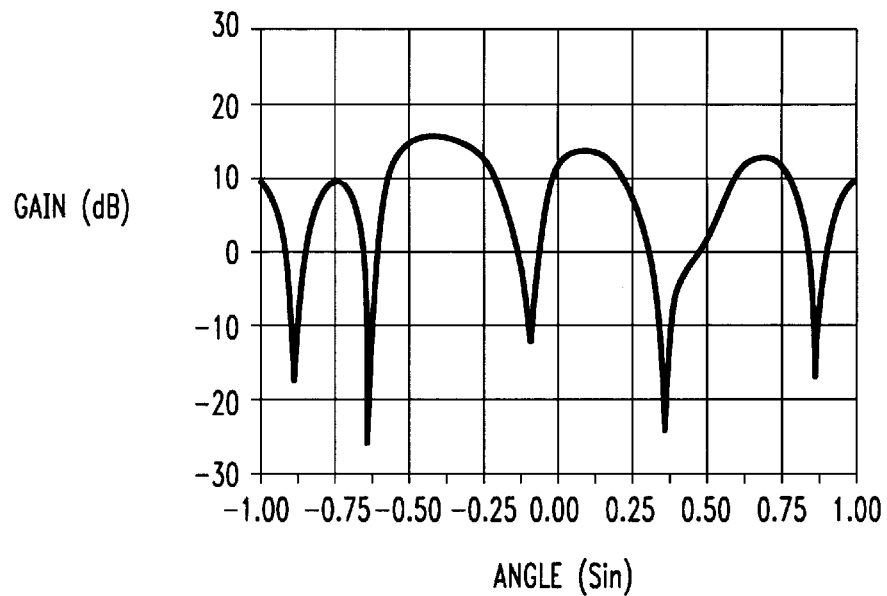
Figure 4D:
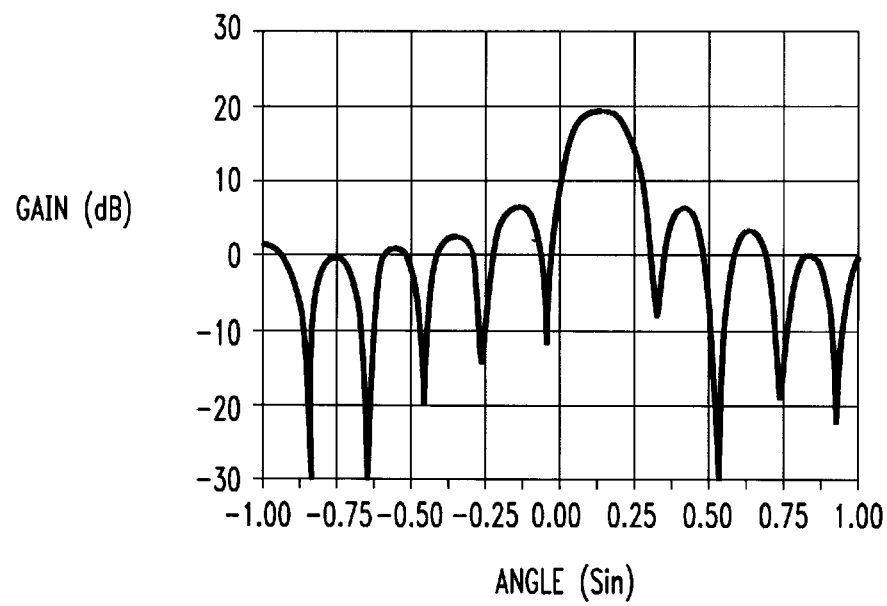

For a case of multi-interference sources, FIG. 4A shows a beam pattern representing the desired station of interest at +7.2° and two interferers I, $I_2$, each 20 dB larger, on either side. FIGS. 4B and 4C show the patterns after rejection of each interferer, and FIG. 4C shows the final result after elimination of distortion. The distortion is eliminated by dividing the beam pattern signal by the IRP transfer function discussed above in connection with equation (9). The pattern, as well as the processed signal, are in fact what would have been observed had the interference been non-existent.

Processors built in accordance with the present invention may be used for either receiving or transmitting purposes. When used for transmitting purposes, the processor is connected between the antenna elements and steerable beamformer of FIG. 1 so that its input and output ports are interchanged.

While the present invention has been particularly shown and described with reference to certain preferred embodiments, it will be understood by those skilled in the art that certain changes and modifications may be made therein without departing from the spirit and scope of the present invention, which is limited only by the attached claims.

I claim:

1. Apparatus for steerable nulling of radio frequency signals having a carrier wave with wideband pulse signals, comprising:

an antenna array of n elements having a radiation pattern of a main lobe and at least one side lobe with at least one null point for receiving said radio frequency signals from or transmitting said radio frequency signals to a desired station and at least one interfering station, said antenna array having a fractional bandwidth, E, such that the pulses of said radio frequency signals at the opposite end elements of said antenna array have substantial overlap, where E=nB/f with
n=to the number of elements of said antenna array,
B=to the bandwidth of the pulse signals, and
f=to the carrier wave frequency, and an interference rejection processor (IRP) having n inputs, each said IRP input connected to a respective element of said antenna array, said IRP steering the effect of said radiation pattern of said antenna array such that the at least one null point substantially corresponds to the reception of said radio frequency signals from or transmission to the interfering station.

2. Apparatus as in claim 1 wherein said IRP adjusts said effect of said radiation pattern using only phase delay of the radio frequency signals at the opposite end elements of said antenna array.

3. Apparatus as in claim 1 wherein said IRP adjusts said effect of said radiation pattern using only phase delay of said radio frequency signals.

4. Apparatus as in claim 3 wherein $E \leq 0.15$.

5. Apparatus as in claim 4 wherein $E \leq 0.003$.

6. Apparatus for steerable nulling of radio frequency signals having a carrier wave with wideband pulse signals, comprising:

an antenna array of n elements having a radiation pattern of a main lobe and at least one side lobe and at least two null points for receiving said radio frequency signals from or transmitting said radio frequency signals to two interfering stations at spaced locations, said antenna array having a fractional bandwidth, E, such that the pulses of said radio frequency signals at the opposite end elements of said antenna array have substantial overlap, where E=nB/f with
n=to the number of elements in said antenna array,
B=to the bandwidth of the pulse signals, and
f=to the carrier wave frequency, and an interference rejection processor (IRP) having n inputs, each said IRP input connected to a respective element of said antenna array, and said IRP steering the effect of said radiation pattern such that a different null point of said radiation pattern substantially corresponds to said radio frequency signals received from, or transmitted to, each interfering station.

7. Apparatus as in claim 6 wherein $E \leq 0.15$.

8. Apparatus as in claim 7 wherein $E \leq 0.003$.

9. Apparatus as in claim 6 wherein said IRP comprises:

a multiplier-summer for receiving a signal S+I from each element of said antenna array for producing a normalized output of the sum of the signals of said n antenna elements, where S is the amplitude of the signal at each said element from the desired station and I the amplitude of the signal from the interfering station; and a plurality of subtractor circuits each for receiving the output of said multiplier-summer and the signal S+I from a respective element of said antenna array for subtracting the output S+I of the respective element from said normalized sum output of said multiplier summer to produce an output for each said subtractor circuit of $$I_o + S_o - 1/n \sum_{k=1}^{n} (I_k + S_k)$$

where $S_k$ and $I_k$ are the amplitudes of the desired signal and interference signal at the nth element of the array.

10. Apparatus as in claim 9 wherein there are a plurality of said summer amplifiers each for receiving the signal S+I for a respective antenna element, each of said plurality of multiplier-summers supplying its output to a respective one of said subtractors.

11. Apparatus as in claim 10 wherein said IRP further comprises a phase delay element between each said antenna element and said respective one of said plurality of multiplier summers, the signal S+I from each said antenna element being supplied directly to a respective one of said subtractors.

12. A method at a principal station for steerable nulling of an antenna array of n elements having a radiation pattern of a main lobe and at least one side lobe with at least one null point for receiving said radio frequency signals from, or transmitting radio frequency signals to, a desired station and at least one interfering station, said method comprising the steps of:

receiving said radio frequency signals from, or transmitting said radio frequency signals to, the station of interest and the interfering station from the elements of said antenna array;

supplying the signals received by said antenna array elements to an interference rejection processor (IRP), or supplying said radio frequency signals to be transmitted from said IRP, to said antenna array, said IRP having n ports each connected to a respective element of said antenna array, said IRP steering the effect of said radiation pattern of said antenna array such that the at least one null point corresponds to the reception of said radio frequency signals from, or transmission to, the interfering station; and wherein said antenna array has a fractional bandwidth E =nB/f with
n=to the number of elements in said antenna array,
B=to the bandwidth of the pulse signals, and
f=to the carrier wave frequency,
to permit operating said IRP using only phase delay of said radio frequency signals to steer said radiation pattern.

13. The method as in claim 12 further comprising the steps of first pointing said antenna array radiation pattern main lobe at the interfering station, setting said IRP to effect the desired steering of said radiation pattern null, and re-pointing said antenna array radiation pattern to its normal position.

14. The method as in claim 13 wherein said IRP comprises:

a multiplier-summer to which is applied the signal S+I from each element of said antenna array and which produces a normalized output of the sum of the outputs of said antenna elements, where S is the amplitude of the signal at each said element from the desired station and I the amplitude of the signal from the interfering station; and a plurality of subtractor circuits to which its applied the output of said multiplier-summer and the signal S+I from a respective element of said antenna array and which subtractor circuit subtracts the output S+I of the respective element from said normalized sum output of said multiplier-summer to produce an output for each said subtractor circuit of $$I_o + S_o - 1/n \sum_{k=1}^{n} (I_k + S_k)$$

where $S_k$ and $I_k$ are the amplitudes of the desired signal and interference signal at the nth element of the array.

15. The method as in claim 14 wherein there are a plurality of said summer amplifiers each for receiving the signal S+I for a respective antenna element, each of said plurality of multiplier-summers supplying its output to a respective one of said subtractors.

16. The method as in claim 15 wherein said IRP further comprises a phase delay element between each said antenna element and said respective one of said plurality of multiplier summers, the signal S+I from each said antenna element being supplied directly to a respective one of said subtractors.

17. Apparatus as in claim 16 wherein said IRP operates to steer the effect of said radiation pattern using only phase delay of said radio frequency signals.

* * * * *

UNITED STATES PATENT AND TRADEMARK OFFICE
CERTIFICATE OF CORRECTION

PATENT NO. : 5,926,135
DATED : July 20, 1999
INVENTOR(S) : John MINKOFF

It is certified that error appears in the above-identified patent and that said Letters Patent is hereby corrected as shown below: Title page:

Item [22] Filing Date, "Oct. 8, 1998" should be --Jan 8, 1998--.

Signed and Sealed this

First Day of February, 2000

Attest:

Q. TODD DICKINSON

*Attesting Officer*       *Acting Commissioner of Patents and Trademarks*